United States Patent
Hon et al.

(12)

(10) Patent No.: US 11,008,111 B2
(45) Date of Patent: May 18, 2021

(54) PROPULSION SYSTEM FOR AN AIRCRAFT

(71) Applicant: General Electric Company, Schenectady, NY (US)

(72) Inventors: Robert Charles Hon, Fort Mitchell, KY (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/632,814

(22) Filed: Jun. 26, 2017

(65) Prior Publication Data

US 2018/0370646 A1   Dec. 27, 2018

(51) Int. Cl.

| | |
|---|---|
| *B64D 31/06* | (2006.01) |
| *F02C 7/32* | (2006.01) |
| *F02K 5/00* | (2006.01) |
| *B60K 6/24* | (2007.10) |
| *F02C 6/14* | (2006.01) |

(Continued)

(52) U.S. Cl.
CPC ............... *B64D 31/06* (2013.01); *B60K 6/24* (2013.01); *B64D 27/18* (2013.01); *B64D 27/24* (2013.01); *F01D 21/003* (2013.01); *F02C 6/14* (2013.01); *F02C 7/32* (2013.01); *F02K 3/06* (2013.01); *F02K 5/00* (2013.01); *B64D 2027/026* (2013.01); *F02C 3/04* (2013.01); *F05D 2220/76* (2013.01); *F05D 2260/42* (2013.01); *F05D 2270/051* (2013.01); *F05D 2270/101* (2013.01);

(Continued)

(58) Field of Classification Search
None
See application file for complete search history.

(56) References Cited

U.S. PATENT DOCUMENTS

| | | | | |
|---|---|---|---|---|
| 2,462,201 A | * | 2/1949 | Kilgore | ................ B64D 27/24 244/60 |
| 4,608,639 A | | 8/1986 | Morishita et al. | |

(Continued)

FOREIGN PATENT DOCUMENTS

| | | |
|---|---|---|
| EP | 1947311 A2 | 7/2008 |
| EP | 2657457 A2 | 10/2013 |

(Continued)

OTHER PUBLICATIONS

"Rimac Automobili, Rimac All Wheel Torque Vectoring, Feb. 18, 2016, Youtube." https://www.youtube.com/watch?v=bD2Do1gAuog (Year: 2016).*

(Continued)

*Primary Examiner* — Rami Khatib
(74) *Attorney, Agent, or Firm* — Dority Manning, P.A.

(57) ABSTRACT

A hybrid-electric propulsion system includes a turbomachine and an electric machine coupled to the turbomachine. A method for operating the hybrid-electric propulsion system includes receiving information indicative of an operability parameter of the turbomachine; determining the turbomachine is operating within a predetermined operability range based at least in part of the received information indicative of the operability parameter of the turbomachine; and operating the hybrid electric propulsion system in an electric generation mode to generate electric power with the electric machine in response to determining the turbomachine is operating within the predetermined operability range.

20 Claims, 9 Drawing Sheets

(51) Int. Cl.
  *B64D 27/18* (2006.01)
  *B64D 27/24* (2006.01)
  *F01D 21/00* (2006.01)
  *F02K 3/06* (2006.01)
  *B64D 27/02* (2006.01)
  *F02C 3/04* (2006.01)

(52) U.S. Cl.
  CPC ..... F05D 2270/303 (2013.01); Y10S 903/903 (2013.01)

(56) References Cited

U.S. PATENT DOCUMENTS

| | | | |
|---|---|---|---|
| 4,968,942 | A | 11/1990 | Palanisamy |
| 5,886,418 | A | 3/1999 | Kondo et al. |
| 6,424,123 | B1 | 7/2002 | Odaohhara et al. |
| 7,513,120 | B2 | 4/2009 | Kupratis |
| 7,610,124 | B2 | 10/2009 | Wakashiro et al. |
| 7,635,922 | B2 | 12/2009 | Becker |
| 7,906,864 | B2 | 3/2011 | Ko |
| 8,179,092 | B2 | 5/2012 | Timmons et al. |
| 8,201,414 | B2 | 6/2012 | Haehner et al. |
| 8,561,413 | B2 | 10/2013 | Taneja |
| 8,957,539 | B1 | 2/2015 | Ralston |
| 8,988,019 | B2 | 3/2015 | Funabashi et al. |
| 2002/0175522 | A1 | 11/2002 | Wacknov et al. |
| 2006/0042252 | A1 | 3/2006 | Derouineau |
| 2009/0145998 | A1* | 6/2009 | Salyer ............... B64C 27/04 244/17.23 |
| 2009/0211260 | A1 | 8/2009 | Kesseli ............... F02C 1/02 60/786 |
| 2009/0306837 | A1* | 12/2009 | Ausman ............... G01D 7/00 701/3 |
| 2010/0058731 | A1* | 3/2010 | Haehner ............... F01D 15/08 60/39.15 |
| 2010/0107651 | A1* | 5/2010 | Hyde ............... F02C 6/00 60/784 |
| 2011/0087390 | A1* | 4/2011 | Pandit ............... B60K 1/00 701/22 |
| 2012/0017602 | A1 | 1/2012 | Hansen et al. |
| 2012/0221157 | A1 | 8/2012 | Finney et al. |
| 2013/0076120 | A1 | 3/2013 | Wagner et al. |
| 2013/0147192 | A1* | 6/2013 | Condon ............... F02C 7/268 290/34 |
| 2014/0180522 | A1* | 6/2014 | Ideshio ............... B60K 6/48 701/22 |
| 2015/0267591 | A1* | 9/2015 | Miller ............... F01N 11/002 60/273 |
| 2015/0285165 | A1 | 10/2015 | Steinwandel et al. |
| 2015/0298687 | A1* | 10/2015 | Kanno ............... B60K 6/445 701/22 |
| 2015/0318725 | A1* | 11/2015 | Brockman ............... H02J 7/0047 340/636.1 |
| 2016/0076446 | A1* | 3/2016 | Bailey Noval ........... F02C 6/14 60/801 |
| 2016/0167799 | A1 | 6/2016 | Smaoui et al. |
| 2016/0236790 | A1* | 8/2016 | Knapp ............... B64C 11/001 |
| 2016/0281529 | A1* | 9/2016 | Chen ............... F02C 9/28 |
| 2016/0304211 | A1* | 10/2016 | Swann ............... B64D 31/06 |
| 2016/0325629 | A1 | 11/2016 | Siegel et al. |
| 2017/0044989 | A1 | 2/2017 | Gemin et al. |
| 2017/0057650 | A1* | 3/2017 | Walter-Robinson ........ B64D 41/00 |
| 2017/0175646 | A1* | 6/2017 | Adibhatla ............... F02C 9/18 |
| 2017/0226934 | A1 | 8/2017 | Robic et al. |
| 2017/0247114 | A1* | 8/2017 | Moulon ............... F01D 15/10 |
| 2017/0320585 | A1* | 11/2017 | Armstrong ............... B64D 27/10 |
| 2018/0079515 | A1* | 3/2018 | Harwood ............... H02J 7/34 |
| 2018/0143257 | A1* | 5/2018 | Garcia ............... G01R 31/367 |
| 2018/0178921 | A1* | 6/2018 | Bak ............... B64D 27/24 |
| 2018/0201383 | A1* | 7/2018 | Bachmaier ............... B60L 50/15 |

FOREIGN PATENT DOCUMENTS

EP 2728141 A2 5/2014
WO WO2014/158240 10/2014

OTHER PUBLICATIONS

U.S. Appl. No. 14/826,482, filed Aug. 14, 2015.

* cited by examiner

PROPULSION SYSTEM FOR AN AIRCRAFT

FIELD

The present subject matter relates generally to a hybrid-electric aircraft propulsion system, and more particularly to a method for charging an electric energy storage unit of the hybrid-electric aircraft propulsion system.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Propulsion systems have been proposed of a hybrid-electric type, including in some cases an electric fan in addition to at least one gas turbine engine. In order to increase an efficiency of such a hybrid electric propulsion system, the inventors of the present disclosure have recognized that a battery pack may be included to store electrical power and provide such electrical power to, e.g., the electric fan, when most deserving throughout a flight envelope. However, the inventors of the present disclosure further recognize that the battery pack may be susceptible to damage and failure if electrical power is not provided thereto in an appropriate manner, and further that charging the battery pack may adversely affect a performance of the gas turbine engine depending on, e.g., one or more operating conditions of the gas turbine engine. Accordingly, a hybrid electric propulsion system having a system for charging an energy storage unit while minimizing a risk of damage to the energy storage unit, failure of the energy storage, and/or adversely affecting performance of the gas turbine engine unit would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method for operating a hybrid-electric propulsion system of an aircraft is provided. The hybrid-electric propulsion system includes a turbomachine and an electric machine coupled to the turbomachine. The method includes receiving information indicative of an operability parameter of the turbomachine; determining the turbomachine is operating within a predetermined operability range based at least in part of the received information indicative of the operability parameter of the turbomachine; and operating the hybrid electric propulsion system in an electric generation mode to generate electric power with the electric machine in response to determining the turbomachine is operating within the predetermined operability range.

In certain exemplary aspects receiving information indicative of the operability parameter of the turbomachine includes receiving information indicative of an exhaust gas temperature of the turbomachine, and wherein determining the turbomachine is operating within the predetermined operability range includes determining the exhaust gas temperature of the turbomachine is below an exhaust gas temperature threshold.

In certain exemplary aspects receiving information indicative of the operability parameter of the turbomachine includes receiving information indicative of a stall margin of the turbomachine, and wherein determining the turbomachine is operating within the predetermined operability range includes determining the stall margin of the turbomachine is above a stall margin threshold.

In certain exemplary aspects receiving information indicative of the operability parameter of the turbomachine includes receiving information indicative of an acceleration demand of the turbomachine, and wherein determining the turbomachine is operating within the predetermined operability range includes determining the acceleration demand of the turbomachine is below a predetermined threshold.

In certain exemplary aspects the hybrid-electric propulsion system further includes an electric energy storage unit, wherein operating the hybrid electric propulsion system in the electric generation mode to generate electric power includes operating the hybrid electric propulsion system in an electric charge mode to charge the electric energy storage unit with the electric machine in response to determining the turbomachine is operating within the predetermined operability range.

For example, in certain exemplary aspects the method further includes determining the electric energy storage unit is in the charge acceptance mode, wherein operating the hybrid electric propulsion system in the electric charge mode includes operating the hybrid electric propulsion system in the electric charge mode in response to determining the electric energy storage unit is in the charge acceptance mode and in response to determining the turbomachine is operating within the predetermined operability range.

For example, in certain exemplary aspects determining the electric energy storage unit is in the charge acceptance mode includes determining a state of charge of the electric energy storage unit is below a predetermined maximum level.

For example, in certain exemplary aspects determining the electric energy storage unit is in the charge acceptance mode includes receiving information indicative of a temperature of the electric energy storage unit and determining the temperature of the electric energy storage unit is within a specified range.

For example, in certain exemplary aspects the method further includes determining the turbomachine is operating in a steady state condition, and wherein operating the hybrid electric propulsion system in the electric charge mode to charge the electric energy storage unit with the electric machine further includes operating the hybrid electric propulsion system in the electric charge mode to charge the electric energy storage unit with the electric machine also in response to determining the turbomachine is operating in the steady state condition.

For example, in certain exemplary aspects operating the hybrid electric propulsion system in the electric charge mode to charge the electric energy storage unit includes rotating the electric machine with the turbomachine and providing electrical power from the electric machine to the electric energy storage unit to charge the electric energy storage unit.

For example, in certain exemplary aspects operating the hybrid electric propulsion system in the electric charge mode to charge the electric energy storage unit with the electric machine further includes modulating an amount of electrical power provided to the electric energy storage unit.

For example, in certain exemplary aspects modulating the amount of electrical power provided to the electric energy storage unit includes modulating the amount of electrical power provided to the electric energy storage unit based at least in part on a state of charge of the electric energy storage unit.

For example, in certain exemplary aspects modulating the amount of electrical power provided to the electric energy storage unit includes modulating the amount of electrical power provided to the electric energy storage unit based at least in part on the received information indicative of the operability parameter of the turbomachine.

For example, in certain exemplary aspects operating the hybrid electric propulsion system in the electric charge mode to charge electric energy storage unit with the electric machine includes providing the electric energy storage unit with at least about five kilowatts of electrical power.

The method of claim 1, wherein the electric machine is a first electric machine, wherein the hybrid electric propulsion system further includes a second electric machine and a second propulsor coupled to the second electric machine, wherein operating the hybrid electric propulsion system in the electric generation mode to generate electric power with the electric machine includes providing electrical power from the first electric machine to the second electric machine of the hybrid electric propulsion system to drive the second propulsor and provide propulsive benefit to the aircraft.

In certain exemplary aspects operating the hybrid electric propulsion system in the electric charge mode includes modifying operation of the turbomachine to maintain a substantially constant output power.

In certain exemplary aspects operating the hybrid electric propulsion system in the electric generation mode to generate electric power includes extracting electric power from the turbomachine using the electric machine and transferring such electric power to at least one of a load on the aircraft or an electric powered fan of the hybrid electric propulsion system.

In an exemplary embodiment of the present disclosure, a hybrid-electric propulsion system is provided. The hybrid-electric propulsion system includes a turbomachine; an electrical system including an electric machine coupled to the turbomachine and an electric energy storage unit electrically connectable to the electric machine; and a controller. The controller is configured to determine the turbomachine is operating within a predetermined operability range based at least in part on information received indicative of an operability parameter of the turbomachine, and further to operate the hybrid electric propulsion system in an electric charge mode to charge the electric energy storage unit with the electric machine in response to determining the turbomachine is operating within the predetermined operability range.

In certain exemplary embodiments the electric energy storage unit is configured to store at least about fifty kilowatt hours of electrical power.

In certain exemplary embodiments the operability parameter is one or more of an exhaust gas temperature of the turbomachine, a stall margin of the turbomachine, and an acceleration demand of the turbomachine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
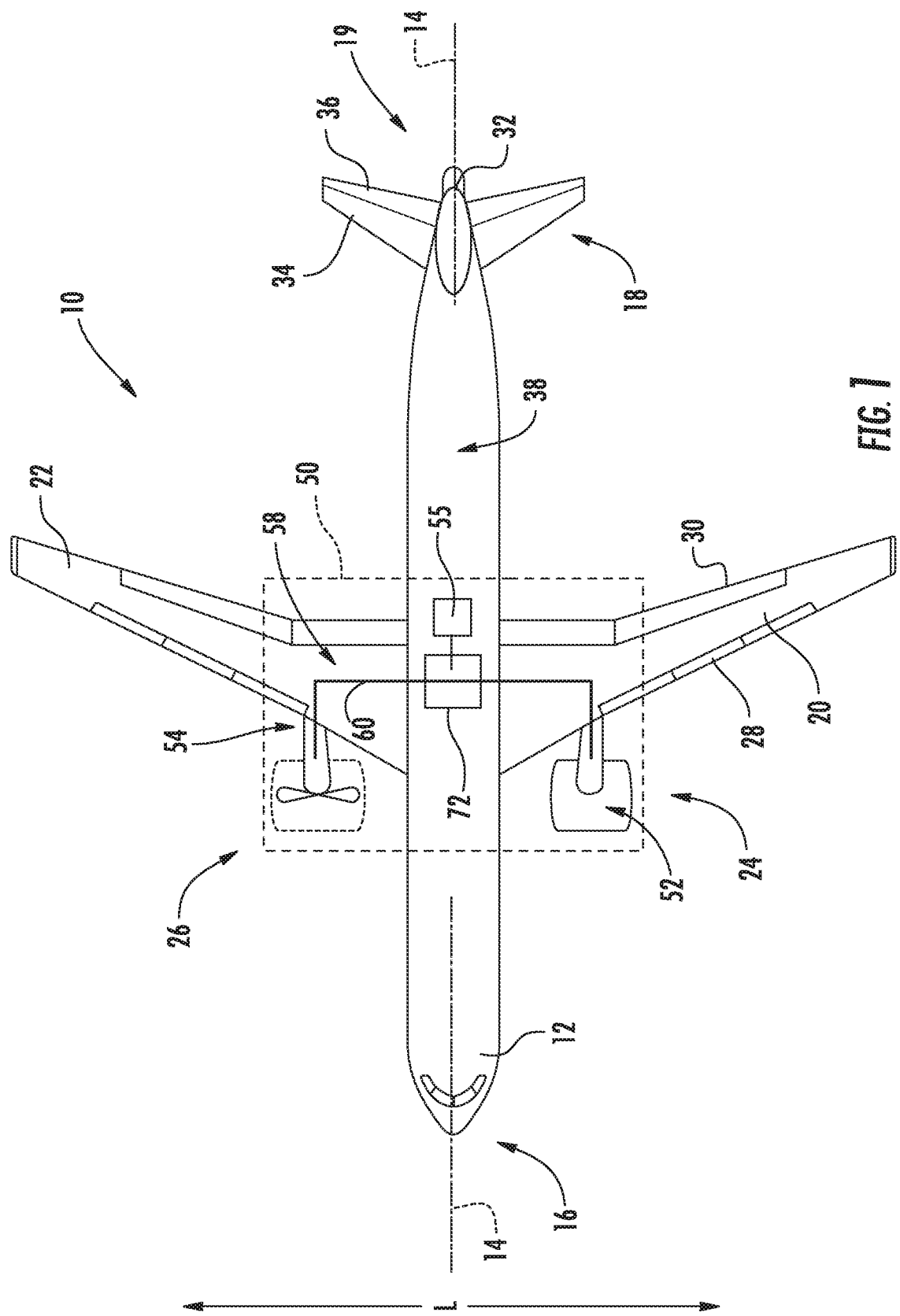
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a method of operating a hybrid electric propulsion system of an aircraft in a manner to charge an electric energy storage unit of the hybrid electric propulsion system using an electric machine coupled to a turbomachine. The method may generally be operable to charge the electric energy storage unit while minimizing a risk of damaging the electric energy storage unit; while preventing damage, wear, and/or stall of the turbomachine; and/or while avoiding any adverse effects to a performance of the turbomachine and aircraft.

Broadly, the method may first include determining the electric energy storage unit is in a charge acceptance mode. Additionally, the method may include receiving information indicative of an operability parameter of the turbomachine and determining the turbomachine is operating with a predetermined operability range based at least in part on the received information indicative of the operability parameter of the turbomachine. In response to making such a determination, the method may operate the hybrid electric propulsion system in an electric charge mode to charge the electric energy storage unit with the electric machine.

For example, in certain exemplary aspects, the method may ensure the electric energy storage unit is not currently overcharged, overheated, etc. when determining whether or not to charge the electric energy storage unit (i.e., in the charge acceptance mode).

Also for example, in certain exemplary aspects, the operability parameter may be, or may be indicative above, an exhaust gas temperature of the turbomachine, a stall margin of the turbomachine, an acceleration demand of the turbomachine, etc. With such exemplary aspects, the method may ensure the hybrid electric propulsion system is not extracting power from the turbomachine when, e.g., the turbomachine is operating within an undesirable range of the exhaust gas temperature limit, when the turbomachine is operating undesirable close to the stall margin, the turbomachine is not attempting to accelerate, etc. Such may minimize a risk of damaging/prematurely wearing the turbomachine and further may minimize a risk of stalling the turbomachine. Additionally, such may ensure the turbomachine is capable of producing sufficient thrust for aircraft use. It will be appreciated from the discussion below, that the potentially-high power extraction levels that are relevant to a large hybrid propulsion system, power extraction from the turbomachine may be high enough to impact the turbomachine's thrust output.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
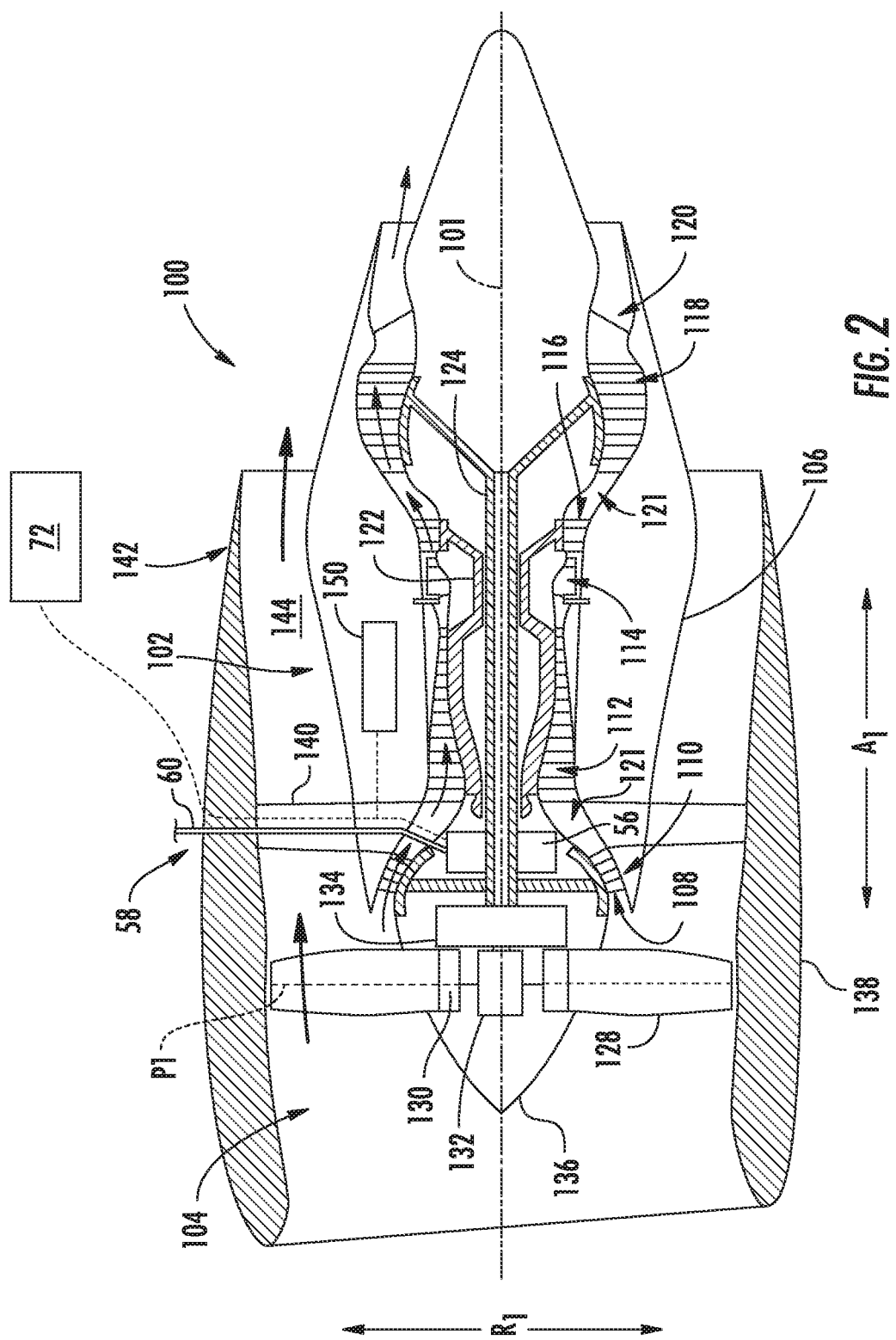
FIG. 2 is a schematic, cross-sectional view of a gas turbine engine mounted to the exemplary aircraft of FIG. 1.
Figure 3:
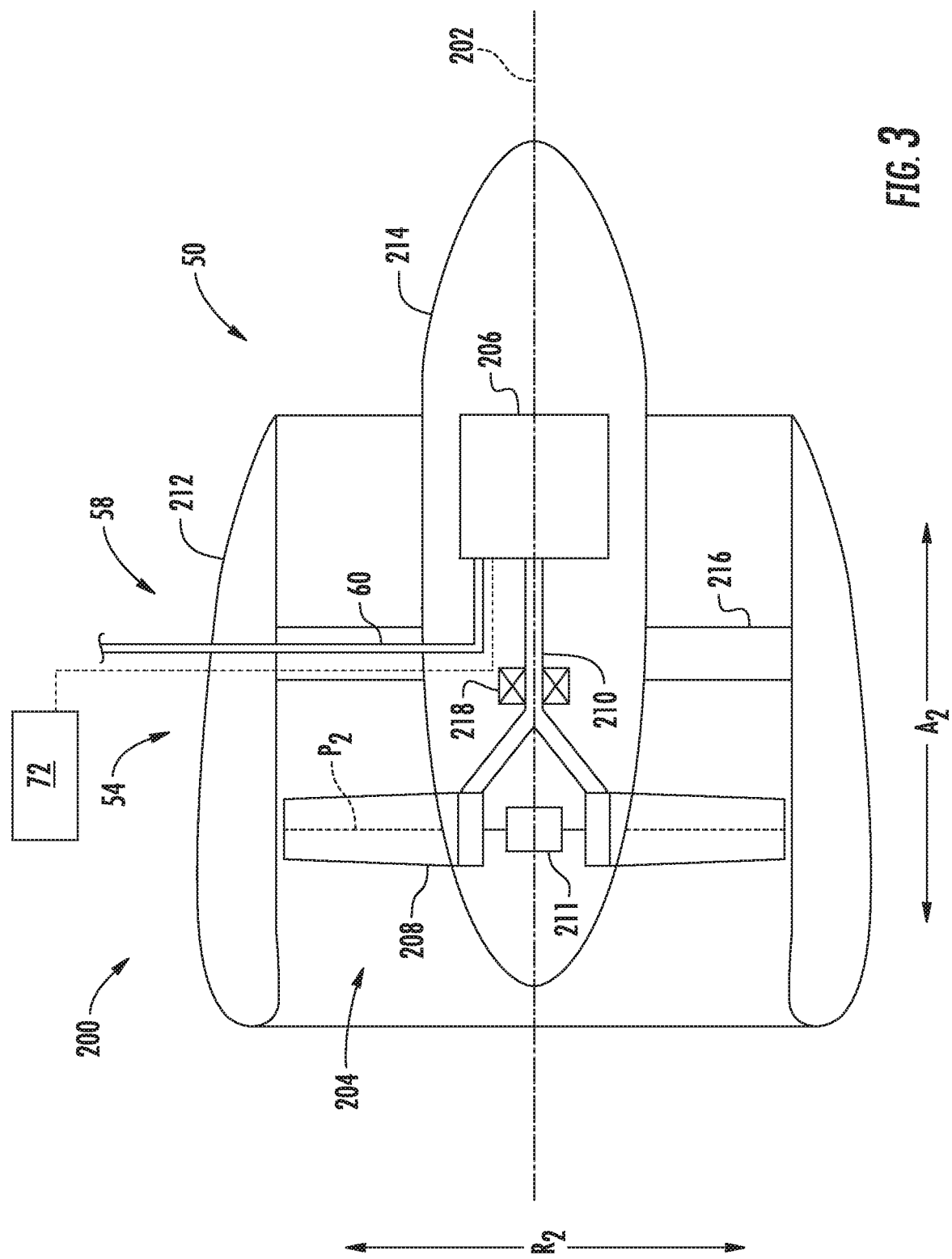
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

More particularly, referring generally to FIGS. 1 through 3, the exemplary hybrid-electric propulsion system 50 generally includes the first propulsor assembly 52 having a turbomachine and a prime propulsor (which, for the embodiment of FIG. 2 are configured together as a gas turbine engine, or rather as a turbofan engine 100), an electric machine 56 (which for the embodiment depicted in FIG. 2 is an electric motor/generator) drivingly coupled to the turbomachine, the second propulsor assembly 54 (which for the embodiment of FIG. 3 is configured as an electric propulsor assembly 200), an electric energy storage unit 55 (electrically connectable to the electric machine 56 and/or the electric propulsor assembly 200), a controller 72, and a power bus 58. The electric propulsor assembly 200, the electric energy storage unit 55, and the electric machine 56 are each electrically connectable to one another through one or more electric lines 60 of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50.

As will be appreciated, the controller 72 may be configured to distribute electrical power between the various components of the hybrid-electric propulsion system 50. For example, the controller 72 may be operable with the power bus 58 (including the one or more switches or other power electronics) to provide electrical power to, or draw electrical power from, the various components, such as the electric machine 56, to operate the hybrid electric propulsion system 50 between various operating modes and perform various functions. Such is depicted schematically as the electric lines 60 of the power bus 58 extending through the controller 72, and will be discussed in greater detail below.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc. For example, the controller 72 may be configured in substantially the same manner as the exemplary computing system 500 described below with reference to FIG. 9 (and may be configured to perform one or more of the functions of the exemplary method 300, described below).

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

Referring now particularly to FIGS. 1 and 2, the first propulsor assembly 52 includes a gas turbine engine mounted, or configured to be mounted, to the first wing 20 of the aircraft 10. More specifically, for the embodiment of FIG. 2, the gas turbine engine includes a turbomachine 102 and a propulsor, the propulsor being a fan (referred to as "fan 104" with reference to FIG. 2). Accordingly, for the embodiment of FIG. 2, the gas turbine engine is configured as a turbofan engine 100.

The turbofan engine 100 defines an axial direction A1 (extending parallel to a longitudinal centerline 101 provided for reference) and a radial direction R1. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121 through the turbomachine 102.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100, inward of the core air flowpath 121, and is coupled to/in mechanical communication with one of the shafts of the turbofan engine 100. More specifically, for the embodiment depicted, the electric machine is coupled to the second, LP turbine 118 through the LP shaft 124. The electric machine 56 may be configured to convert mechanical power of the LP shaft 124 to electrical power (such that the LP shaft 124 drives the electric machine 56), or alternatively the electric machine 56 may be configured to convert electrical power provided thereto into mechanical power for the LP shaft 124 (such that the electric machine 56 drives, or assists with driving, the LP shaft 124).

It should be appreciated, however, that in other exemplary embodiments, the electric machine 56 may instead be positioned at any other suitable location within the turbomachine 102 or elsewhere. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although the electric machine 56 is described as an electric motor/generator, in other exemplary embodiments, the electric machine 56 may be configured solely as an electric generator.

Referring still to FIGS. 1 and 2, the turbofan engine 100 further includes a controller 150 and a plurality of sensors (not shown). The controller 150 may be a full authority digital engine control system, also referred to as a FADEC. The controller 150 of the turbofan engine 100 may be configured to control operation of, e.g., the actuation member 132, the fuel delivery system, etc. Additionally, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

Moreover, although not depicted, in certain exemplary embodiments, the turbofan engine 100 may further include one or more sensors positioned to, and configured to, sense data indicative of one or more operational parameters of the turbofan engine 100. For example, the turbofan engine 100 may include one or more temperature sensors configured to sense a temperature within a core air flowpath 121 of the turbomachine 102. For example, such sensors may be configured to sense an exhaust gas temperature at an exit of the combustion section 114. Additionally, or alternatively, the turbofan engine 100 may include one or more pressure sensors to sense data indicative of a pressure within the core air flowpath 121 of the turbomachine 102, such as within a combustor within the combustion section 114 of the turbomachine 102. Further, in still other exemplary embodiments, the turbofan engine 100 may also include one or more speed sensors configured to sense data indicative of a rotational speed of one or more components of the turbofan engine 100, such as one or more of the LP spool 124 or the HP spool 122. Additionally, in certain exemplary embodiments, the turbofan engine 100 may include one or more sensors configured to sense data indicative of an amount of vibration of various components within the turbofan engine, such as an amount of vibration of the LP compressor 110, the HP compressor 112, or various support structures.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the turbofan engine 100 may be configured as any other suitable gas turbine engine. For example, in other embodiments, the turbofan engine 100 may instead be configured as a turboprop engine, an unducted turbofan engine, a turbojet engine, a turboshaft engine, etc.

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electrical power source (e.g., the electric machine 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 and/or the electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of gas turbine engines (such as turbofan engine 100) and electric machines 56.

Further, in other exemplary embodiments, the electric propulsor assembly(ies) 200 and/or gas turbine engine(s) and electric machine(s) 56 may be mounted to the aircraft 10 at any other suitable location in any other suitable manner (including, e.g., tail mounted configurations). For example, in certain exemplary embodiments, the electric propulsor assembly may be configured to ingest boundary layer air and reenergize such boundary layer air to provide a propulsive benefit for the aircraft (the propulsive benefit may be thrust, or may simply be an increase in overall net thrust for the aircraft by reducing a drag on the aircraft).

Moreover, in still other exemplary embodiments, the exemplary hybrid electric propulsion system 50 may have still other configurations. For example, in other exemplary embodiments, the hybrid electric propulsion system 50 may not include a "pure" electric propulsor assembly. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be configured in a similar manner as one or more the exemplary hybrid electric propulsion systems 50 described above with reference to FIGS. 1 through 3.

Figure 4:
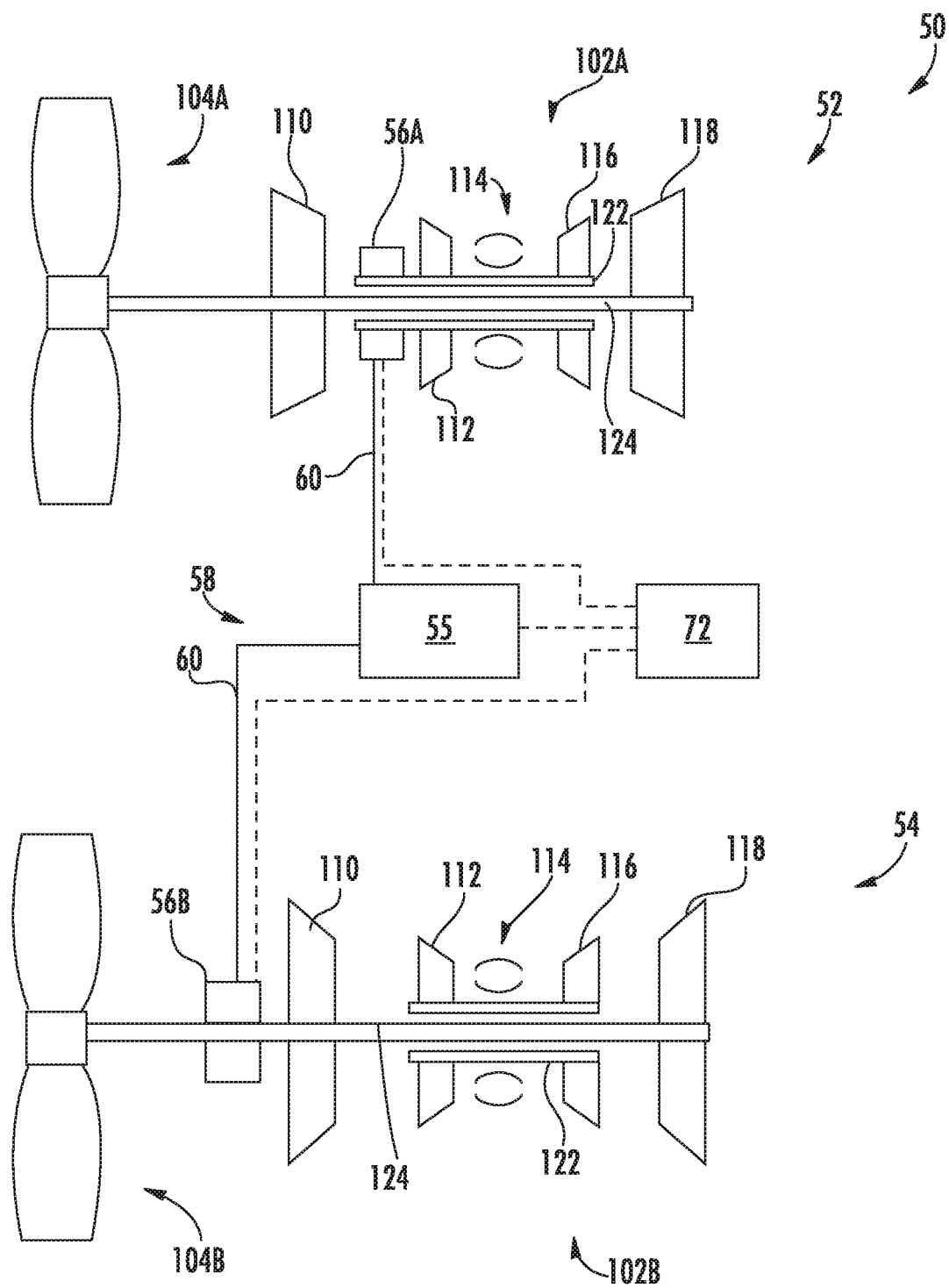
FIG. 4 is a schematic view of a hybrid electric propulsion system in accordance with an exemplary embodiment of the present disclosure.

For example, the exemplary hybrid-electric propulsion system 50 of FIG. 4 generally includes a first propulsor assembly 52 and a second propulsor assembly 54. The first propulsor assembly generally includes a first turbomachine 102A and a first propulsor 104A, and similarly, the second propulsor assembly 54 generally includes a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft 124, as well as a high pressure system having a high pressure compressor 112 drivingly coupled to a high pressure turbine 116 through a high pressure shaft 122. Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine (e.g., similar to the exemplary turbofan engine 100 of FIG. 2). Alternatively, however, these components may instead be configured as parts of a turboprop engine or any other suitable turbomachine-driven propulsion device. Further, in certain exemplary embodiments, the first propulsor assembly 52 may be mounted to a first wing of an aircraft and the second propulsor assembly 54 may be mounted to a second wing of the aircraft (similar, e.g., to the exemplary embodiment of FIG. 1). Of course, in other exemplary embodiments, any other suitable configuration may be provided (e.g., both may be mounted to the same wing, one or both may be mounted to a tail of the aircraft, etc.).

Moreover, the hybrid electric propulsion system 50 of FIG. 4 additionally includes an electrical system. The electrical system includes a first electric machine 56A, a second electric machine 56B, and an electric energy storage unit 55 electrically connectable to the first electric machine 56A and second electric machine 56B. The first electric machine 56A is additionally coupled to the first turbomachine 102A. More specifically, for the embodiment depicted, the first electric machine 56A is coupled to the high pressure system of the first turbomachine 102A, and more specifically still, is coupled to the high-pressure spool 122 of the first turbomachine 102A. In such a manner, the first electric machine 56A may extract power from the high pressure system of the first turbomachine 102A and/or provide power to the high-pressure system of the first turbomachine 102A.

Further, it will be appreciated that for the embodiment depicted, the second propulsor assembly 54 is not configured as a pure electric propulsor assembly. Instead, the second propulsor assembly 54 is configured as part of a hybrid electric propulsor. More particularly, the second electric machine 56B is coupled to the second propulsor 104B, and is further coupled to the low pressure system of the second turbomachine 102B. In such a manner, the second electric machine 56B may extract power from the low pressure system of the second turbomachine 102B and/or provide power to the low pressure system of the first turbomachine 102A. More particularly, in certain exemplary aspects, the second electric machine 56 may drive, or assist with driving the second propulsor 104B.

As is also depicted in FIG. 4, the exemplary hybrid electric propulsion system 50 further includes a controller 72 and a power bus 58. The first electric machine 56A, the second electric machine 56B, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough.

Furthermore, it should be appreciated that in still other exemplary embodiments, the exemplary hybrid electric propulsion system 50 may have other suitable configurations. For example, although the exemplary embodiment of FIG. 4 includes a first electric machine 56A coupled to the high-pressure system of the first turbomachine 102A and the second electric machine 56B coupled to the low pressure system of the second turbomachine 102B, in other exemplary embodiments, each of the electric machines 56A, 56B may be coupled to the low pressure system, or alternatively may be coupled to the high-pressure system. Alternatively, in other exemplary embodiments the electrical system may further include an additional electric machine coupled to the low pressure system of the first turbomachine 102A and/or an additional electric machine coupled to the high-pressure system of the second turbomachine 102B.

As stated above, the present disclosure generally provides for method of operating a hybrid electric propulsion system for an aircraft, and more specifically, provides for method of charging an electric energy storage unit of the hybrid electric propulsion system for the aircraft. For example, referring now to FIG. 5, a schematic diagram 300 is provided depicting an exemplary aspect of the present disclosure.

As is depicted, the schematic diagram 300 first includes at 302 determining whether or not the electric energy storage unit of the hybrid electric propulsion system is in a charge acceptance mode. Determining whether not the electric energy storage unit is in the charge acceptance mode at 302 may include, in certain exemplary aspects, determining a charge level, or state of charge, is below a predetermined threshold (e.g., a maximum threshold). Additionally, or alternatively, in certain exemplary aspects, determining whether or not the electric energy storage unit is in the charge acceptance mode at 302 may include determining whether or not the electric energy storage unit is in a fault condition. For example, determining whether or not the electric energy storage unit is in a fault condition may include monitoring a health of the electric energy storage unit, such as determining whether or not a temperature of the electric energy storage unit is within a specified range. The specified range may be a safe operating range for the electric energy storage unit. Charging, or attempting to charge, outside of this range may potentially damage the electric energy storage unit. Notably, however, determining whether or not the electric energy storage unit is in a fault condition may include monitoring any other health-relevant parameter of the electric energy storage unit. Accordingly, for example, the logic may determine the electric energy storage unit is in the charge acceptance mode at 302 in response to determining the state of charge is below a predetermined threshold, and/or in response to determining the electric energy storage unit is not in a fault condition (e.g., that the temperature of the electric energy storage units within the specified range).

Additionally, the logic depicted in the flow diagram 300 includes determining whether or not an operational parameter of the turbomachine is within a predetermined operability range at 304. In certain exemplary aspects, the operability parameter may be one or more of an exhaust gas temperature of the turbomachine, a stall margin of the turbomachine, an acceleration demand of the turbomachine, a power level of the turbomachine, a bleed air demand from the turbomachine (e.g., an amount of air bled off from the compressor section of the turbomachine downstream of the low pressure compressor and upstream of the high pressure compressor), etc. Accordingly, the logic may determine the turbomachine is within the predetermined operability range at 304 in response to determining, e.g., the exhaust gas temperature of the turbomachine is below a predetermined threshold, a stall margin of the turbomachine is greater than a predetermined threshold, an acceleration demand of the turbomachine is below a predetermined threshold, a power level of the turbomachine is above a minimum threshold (e.g., above idle), and/or a bleed air demand is below a certain threshold (e.g., the engine is operating below a certain power level where a substantial amount of bleed air is being drawn from the turbomachine by, e.g., the aircraft). These operational parameter values may be determined using one or more sensors within the turbomachine. Additionally, these operational parameter values being within the respective predetermined operability ranges may indicate that power may be extracted with a relatively low risk of damaging/prematurely wearing the turbomachine, without limiting the turbomachine's ability to provide an increased thrust if demanded, and further with a relatively low risk of stalling the turbomachine.

As is depicted, the logic depicted in the flow diagram 300 may operate the hybrid electric propulsion system in an electric standby mode at 306 in response to determining that the electric energy storage unit is not operating in a charge acceptance mode at 302 and/or that the operability parameter of the turbomachine is not within the predetermined operability range at 304. When in the standby mode, the electric energy storage unit may, e.g., provide power to the electric machine, or elsewhere, or alternatively, may simply remain idle.

By contrast, however, in response to determining the electric energy storage unit is in the charge acceptance mode at 302 and the operability parameter of the turbomachine is within the predetermined operability range at 304, the logic may operate the hybrid electric propulsion system in an electric charge mode at 308. When operating the hybrid electric propulsion system in the electric charge mode at 308, the hybrid electric propulsion system may operate the electric machine coupled to the turbomachine as an electric generator by rotating the electric machine with the turbomachine to generate electrical power, and provide such electrical power to the electric energy storage unit to charge the electric energy storage unit.

Figure 5:
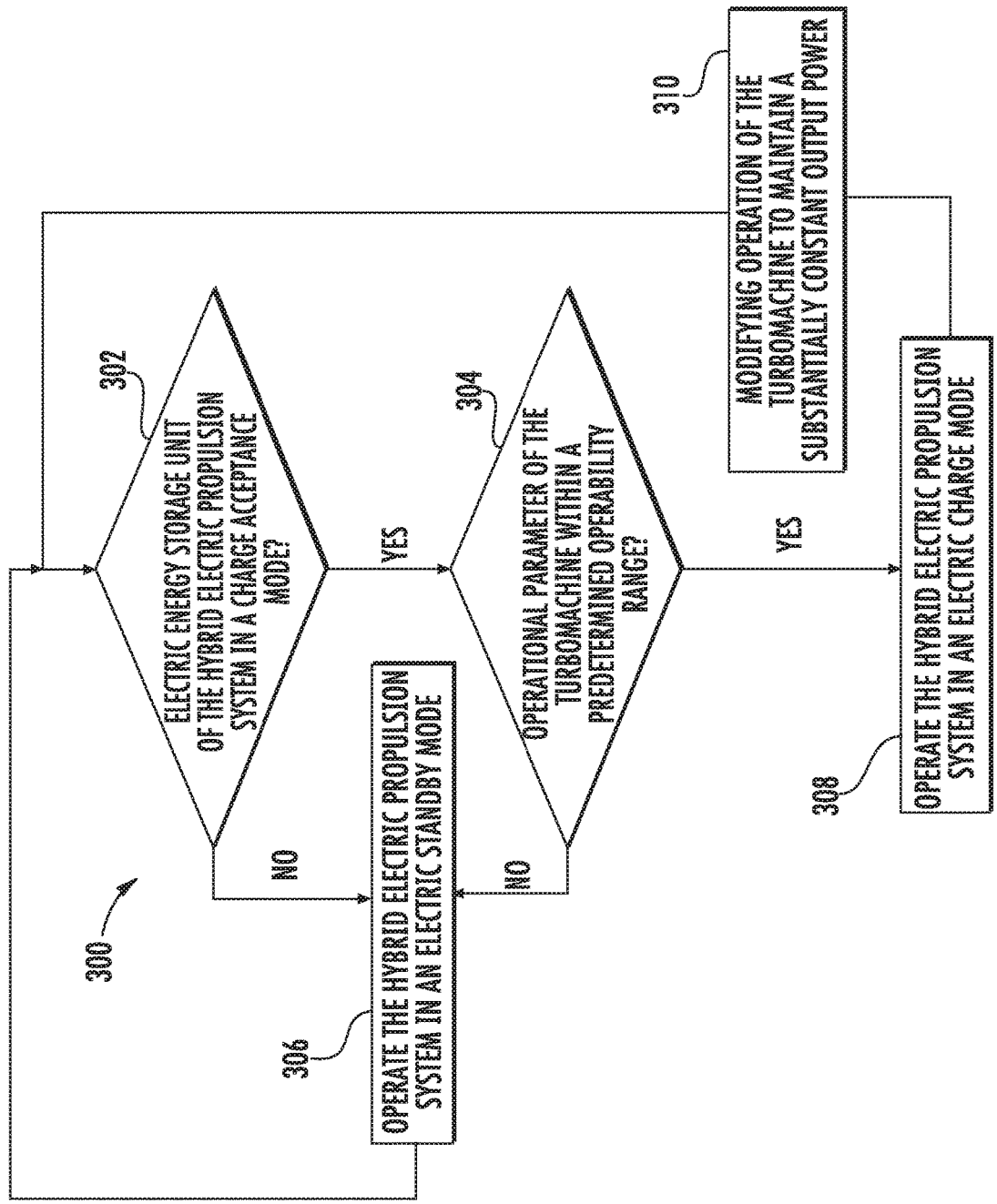
FIG. 5 is a schematic diagram of a method of operating a hybrid electric propulsion system of an aircraft in accordance with an exemplary aspect of the present disclosure.

Notably, for the exemplary aspect depicted in FIG. 5, the logic depicted in the schematic diagram 300 further includes at 310 modifying operation of the turbomachine to maintain a substantially constant output power while operating the hybrid electric propulsion system in the electric charge mode at 308. Accordingly, for example, in certain exemplary aspects, the logic depicted may increase a fuel flow to the turbomachine to account for an effective drag on the turbomachine resulting from the extraction of electrical power through the electric machine when operating the hybrid electric propulsion system in the electric charge mode.

The logic then circles back to ensure the electric energy storage unit stays within the charge acceptance mode at 302 and that the operability parameter for the turbomachine stays within the predetermined operability range at 304 in order to continue operating the hybrid electric propulsion system the electric charge mode at 308, or cease operation at 308 if conditions have changed.

It will be appreciated that although the logic discussed above (and below) with respect to FIG. 5 may appear to be relevant to a configuration in which a single turbomachine charges a single electric energy storage unit, aspects of the present disclosure may further relate to utilizing one or more turbomachines (and associated electric machines) to charge one or more electric energy storage units. For example, if a first electric energy storage unit is not in a charge acceptance mode, electrical power may be diverted to a second electric energy storage unit (assuming the second electric energy storage unit is in a charge acceptance mode). Similarly, if an operability parameter of a first turbomachine is not within a predetermined operability parameter range, a second turbomachine (and associated electric machine) may provide electrical power to the one or more electric energy storage units (provided an operability parameter of the second turbomachine is within a predetermined operability parameter range).

Figure 6:
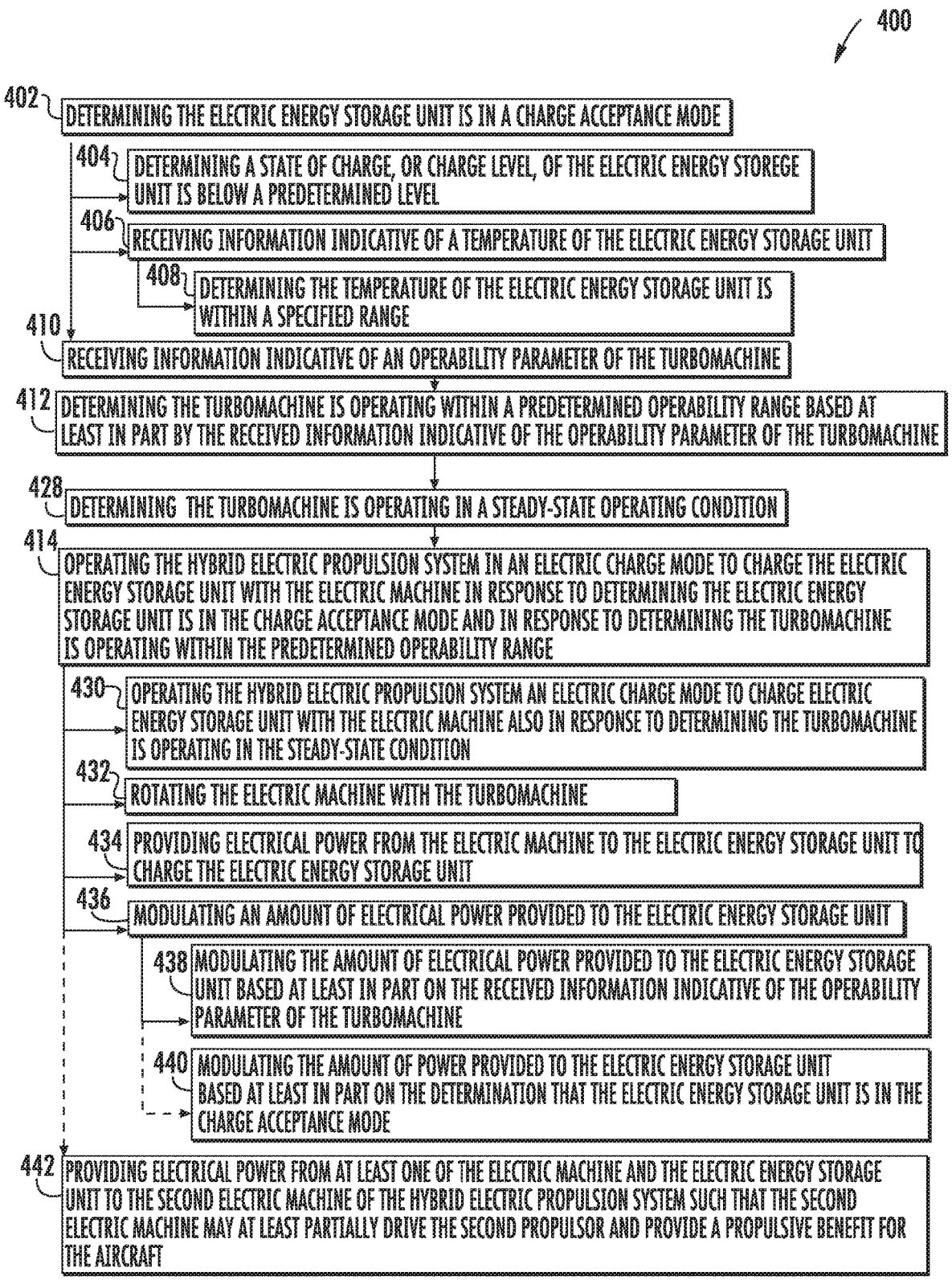
FIG. 6 is a flow diagram of a method of operating a hybrid electric propulsion system of an aircraft in accordance with an exemplary aspect of the present disclosure.

Referring now to FIG. 6, a method 400 for operating a hybrid electric propulsion system of an aircraft in accordance with an exemplary aspect of the present disclosure is provided. The method 400 of FIG. 6 may be similar to the exemplary logic described above with reference to FIG. 5, and further may be operable with one or more the exemplary hybrid electric propulsion systems described above with reference to FIGS. 1 through 4. Accordingly, for example, the exemplary hybrid electric propulsion system may generally include a turbomachine, an electric machine coupled to the turbomachine, and an electric energy storage unit.

The method 400 generally includes at (402) determining the electric energy storage unit is in a charge acceptance mode. Determining the electric energy storage unit is in the charge acceptance mode at (402) may generally include ensuring electric energy storage unit is in a condition to accept an electrical charge. For example, for the exemplary aspect depicted, determining the electric energy storage unit is in the charge acceptance mode at 402 generally includes at (404) determining a state of charge, or charge level, of the electric energy storage unit is below a predetermined level. The predetermined level may be a predetermined maximum level, such as below a maximum charge level for the electric energy storage unit. Additionally, or alternatively, the predetermined level may be a predetermined minimum level for performing certain operations, such as starting the turbomachine or restarting the turbomachine.

Also for the exemplary aspect depicted, determining the electric energy storage unit is in the charge acceptance mode at (402) additionally includes at (406) receiving information indicative of a temperature of the electric energy storage unit and at (408) determining the temperature of the electric energy storage unit is within a specified range. The specified range may be a temperature range within which it is determined that a risk of damaging the electric energy storage unit by charging the electric energy storage unit is minimal. For example, certain electric energy storage units may be susceptible to damage when charging, or attempting to charge, when a temperature of the electric energy storage unit is below a lower temperature threshold, and further, may be susceptible to damaged (e.g., thermal runaway events) when charging, or attempting to charge, when a temperature of the electric energy storage unit is above an upper temperature threshold.

Furthermore, although not depicted, it should be appreciated, that in other exemplary aspects, determining the electric energy storage unit is in the charge acceptance mode at (402) may further include any other suitable determinations for ensuring electric energy storage unit is in a proper condition for accepting an electric charge. For example, in at least certain exemplary aspects, determining the electric energy storage unit is in the charge acceptance mode at (402) may further include determining there are no charge relevant fault indications of the electric energy storage unit.

Referring still to the exemplary aspect of the method 400 depicted in FIG. 6, the method 400 further includes at (410) receiving information indicative of an operability parameter of the turbomachine and at (412) determining the turbomachine is operating within a predetermined operability range based at least in part by the received information indicative of the operability parameter of the turbomachine at (410). Further, as will be discussed in greater detail below, the exemplary aspect of method 400 depicted in FIG. 6 includes operating the hybrid electric propulsion system in an electric generation mode to generate electric power with the electric machine in response to determining the turbomachine is operating within the predetermined operability range, and more specifically includes at (414) operating the hybrid electric propulsion system in an electric charge mode to charge the electric energy storage unit with the electric machine in response to determining the electric energy storage unit is in the charge acceptance mode at (402) and in response to determining the turbomachine is operating within the predetermined operability range at (412).

Figure 7:
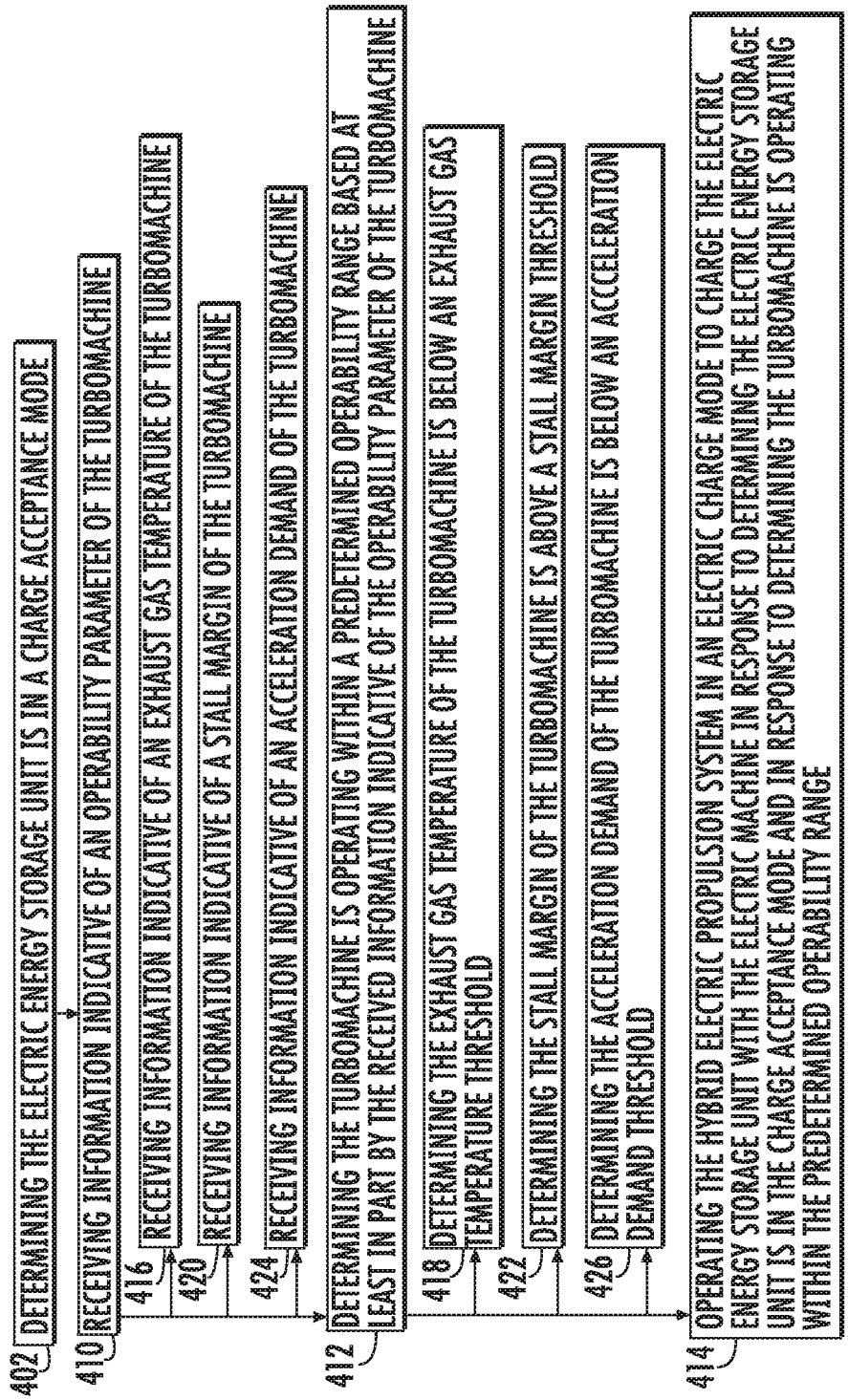
FIG. 7 is a flow diagram of a method of operating a hybrid electric propulsion system of an aircraft in accordance with another exemplary aspect of the present disclosure.

For example, referring now briefly to FIG. 7, providing a flow chart of an exemplary aspect of the method 400 depicted, in at least certain exemplary aspects, receiving information indicative of the operability parameter of the turbomachine at (410) includes at (416) receiving information indicative of an exhaust gas temperature of the turbomachine. Further, with such an exemplary aspect, determining the turbomachine is operating within the predetermined operability range at (412) includes at (418) determining the exhaust gas temperature of the turbomachine is below an exhaust gas temperature threshold. In such a manner, the method 400 may ensure the turbomachine is not pushed beyond a safe, or desired, operating condition limit in order to charge electric energy storage unit. Such may reduce a risk of damaging or prematurely wearing the turbomachine.

Additionally, or alternatively, in at least certain exemplary aspects, receiving information indicative of the operability parameter of the turbomachine at (410) includes at (420) receiving information indicative of a stall margin of the turbomachine. Further, with such an exemplary aspect, determining the turbomachine is operating within the predetermined operability range at (412) includes at (422) determining the stall margin of the turbomachine is above a stall margin threshold. In such a manner, the method 400 may ensure the turbomachine is not placed in a condition for an enhanced risk of stall in order to charge the electric energy storage unit of the hybrid electric propulsion system. The information indicative of the stall margin received at (420) may be, e.g., one or more temperatures within the turbomachine, pressures within the turbomachine, rotational speeds of various components within the turbomachine, health deterioration factors of the turbomachine, etc.

Additionally, or alternatively, still, in at least certain exemplary aspects, receiving information indicative of the operability parameter of the turbomachine at (410) includes at (424) receiving information indicative of an acceleration demand of the turbomachine. With such an exemplary aspect, determining the turbomachine is operating within the predetermined operability range at (412) includes at (426) determining the acceleration demand of the turbomachine is below an acceleration demand threshold. In such a manner, the method 400 may not compromise an ability of the hybrid electric propulsion system, and the turbomachine in particular, to provide increased thrust when being prompted. For example, when operating the hybrid electric propulsion system to perform a step climb, the method may recognize the relatively high acceleration demand on the turbomachine and prevent the hybrid electric propulsion system from operating in the electric charge mode, or stop the hybrid electric propulsion system operating in the electric charge mode, to allow the turbomachine to accelerate in a desired manner.

Additionally, or alternatively, still, although not depicted, in other exemplary aspects, receiving information indicative of the operability parameter of the turbomachine at (410) may include receiving information indicative of any other suitable operability parameter. For example, receiving information indicative of the operability parameter of the turbomachine at (410) may include receiving information indicative of a power level of the turbomachine, a bleed air demand from the turbomachine (e.g., an amount of air bled off from the compressor section of the turbomachine downstream of the low pressure compressor and upstream of the high pressure compressor), etc. Accordingly, it will be appreciated that in certain exemplary aspects, determining the turbomachine is operating within the predetermined operability range at (412) may further include determining a power level of the turbomachine is above a minimum threshold (e.g., above idle), that a bleed air demand is below a certain threshold (e.g., the engine is operating below a certain power level where a substantial amount of bleed air is being drawn from the turbomachine by, e.g., the aircraft), etc.

Furthermore, referring back specifically to the exemplary aspect of the method 400 depicted in FIG. 6, the method 400 includes additional safeguards to ensure the hybrid electric propulsion system is operating in a desired manner before operating the hybrid electric propulsion system in the electric charge mode. More particularly, the exemplary method 400 of FIG. 6 additionally includes at (428) determining the turbomachine is operating in a steady-state operating condition. For example, at least certain exemplary aspects, determining the turbomachine is operating in the steady-state condition at (428) may include monitoring one or more temperatures and/or pressures within the turbomachine over a period of time to determine such temperatures and/or pressures are remaining substantially constant, monitoring inputs from a flight crew (such as throttle) and/or data indicative of these inputs, etc. Additionally, or alternatively, in certain exemplary aspects, determining the turbomachine is operating in the steady-state condition at (428) may include monitoring a rotational speed of one or more rotating components within the turbomachine, either corrected or physical, and determining such rotational speed is remaining substantially constant. Furthermore, as is depicted, with such an exemplary aspect, operating the hybrid electric propulsion system in the electric charge mode to charge the electric energy storage unit with the electric machine at (414) additionally includes at (430) operating the hybrid electric propulsion system an electric charge mode to charge electric energy storage unit with the electric machine also in response to determining the turbomachine is operating in the steady-state condition at (428).

It will be appreciated, however, that the exemplary aspect of the method 400 depicted in FIG. 6 is by way of example only, and that in other exemplary aspects, the method may 400 not include one or more of the exemplary checks depicted. For example, in certain exemplary aspects, the method 400 may wish to charge one or more of the electric energy storage units while the turbomachine is not operating as steady-state.

Referring still to the operation of the hybrid electric propulsion system in the electric charge mode at (414), for the exemplary aspect of the method 400 depicted in FIG. 6, operating the hybrid electric propulsion system in the electric charge mode to charge the electric energy storage unit with the electric machine at (414) additionally includes at (432) rotating the electric machine with the turbomachine and at (434) providing electrical power from the electric machine to the electric energy storage unit to charge the electric energy storage unit. Notably, although not depicted, in at least certain exemplary aspects, providing the electrical power from the electric machine to the electric energy storage unit at (434) may further include providing electrical power through one or more power electronics to condition or convert electrical power. For example, the electrical power may be converted by the power electronics from an alternating current ("AC") electrical power to a direct current ("DC") electric power. Accordingly, with such an exemplary aspect, the power electronics may include a rectifier or other power electronics.

Further, for the exemplary aspect of the method 400 depicted in FIG. 6, operating the hybrid electric propulsion system in the electric charge mode to charge the electric energy storage unit with the electric machine at (414) further includes at (436) modulating an amount of electrical power provided to the electric energy storage unit. For example in the exemplary aspect depicted in FIG. 6, modulating the amount of electrical power provided to the electric energy storage unit at (436) may include at (438) modulating the amount of electrical power provided to the electric energy storage unit based at least in part on the received information indicative of the operability parameter of the turbomachine. For example, if an actual exhaust gas temperature of the turbomachine is well below an exhaust gas temperature threshold, a relatively high amount of electrical power may be provided from the electric machine to the electric energy storage unit to charge electric energy storage unit. By contrast, if the actual exhaust gas temperature of the turbomachine is just slightly below the exhaust gas temperature threshold, a relatively low amount of electrical power may be provided from the electric machine to the electric energy storage unit to charge electric energy storage unit. Similar logic applies for when the operability parameter refers to a stall margin of the turbomachine or an acceleration demand of the turbomachine.

Additionally, or alternatively, as is depicted in phantom, in at least certain exemplary aspects, modulating the amount of electrical power provided to the electric energy storage unit at (436) may include at (440) modulating the amount of power provided to the electric energy storage unit based at least in part on the determination that the electric energy storage unit is in the charge acceptance mode at (402), and more specifically, based at least in part on a state of charge of the electric energy storage unit determined. For example, wherein a state of charge of the electric energy storage unit is well below a desired state of charge, a relatively high amount of electrical power may be provided from the electric machine to the electric energy storage unit to charge the electric energy storage unit. By contrast, wherein the state of charge of the electric energy storage unit is just slightly below the desired state of charge, a relatively low amount of electrical power may be provided from the electric machine to the electric energy storage unit to charge the electric energy storage unit. Additionally, or alternatively, modulating at (440) the amount of power provided to the electric energy storage unit based at least in part on the determination that the electric energy storage unit is in the charge acceptance mode may include modulating the amount of power provided to the electric energy storage unit based at least in part on a temperature of the electric energy storage unit. For example, an amount of electric energy provided to the electric energy storage unit may be reduced as the temperature approaches a relevant temperature limit.

Further, as discussed with reference to the exemplary embodiments above, it will be appreciated that the electric energy storage unit is a relatively large electric energy storage unit and the electric machine is a relatively powerful electric machine. For example, the electric energy storage unit may be configured to store at least about fifty kilowatt hours electrical power. Additionally, in certain exemplary aspects, operating the hybrid electric propulsion system in the electric charge mode at (414) may include providing at least about five kilowatts of electrical power.

Referring still to the exemplary aspect of the method 400 depicted in FIG. 6, as discussed above, in at least certain exemplary aspects the hybrid electric propulsion system may further include a second electric machine coupled to a second propulsor. For example, the second propulsor may be configured as part of an electric propulsor assembly (e.g., an electric fan), or alternatively may be configured with a second turbomachine as, e.g., a second turbofan engine. With one or more of these embodiments, the method 400 may further include (as is depicted in phantom) at (442) providing electrical power from at least one of the electric machine and the electric energy storage unit to the second electric machine of the hybrid electric propulsion system such that the second electric machine may at least partially drive the second propulsor and provide a propulsive benefit for the aircraft (e.g., thrust). Notably, although depicted as a separate element, in certain exemplary aspects, operating the hybrid electric propulsion system in the electric generation mode to generate electric power with the electric machine in response to determining the turbomachine is operating within the predetermined operability range may include providing electrical power from at least one of the electric machine and the electric energy storage unit to the second electric machine of the hybrid electric propulsion system.

Additionally, or alternatively in still other exemplary aspects of the method 400 depicted, the method 400 may further include providing electrical power from the electric energy storage unit to the electric machine to drive, or assist with driving the turbomachine, the propulsor, or both.

Operating the hybrid electric propulsion system in accordance with one or more of the above exemplary aspects may allow for charging of the electric energy storage unit without compromising a desired operation of the remaining components of the hybrid electric propulsion system, such as of the turbomachine of the hybrid electric propulsion system, and with a reduced risk of damaging or prematurely wearing the turbomachine.

Furthermore, although the method 400 (and logic 300) is generally directed at determining when to charge the electric energy storage unit with the electric machine, it should be appreciated that the method 400 (and logic 300) may further be applied in a more general manner to determine when to extract power from a turbomachine using an electric machine to, e.g., provide electrical power to a load of the aircraft or of the hybrid electric propulsion system.

Figure 8:
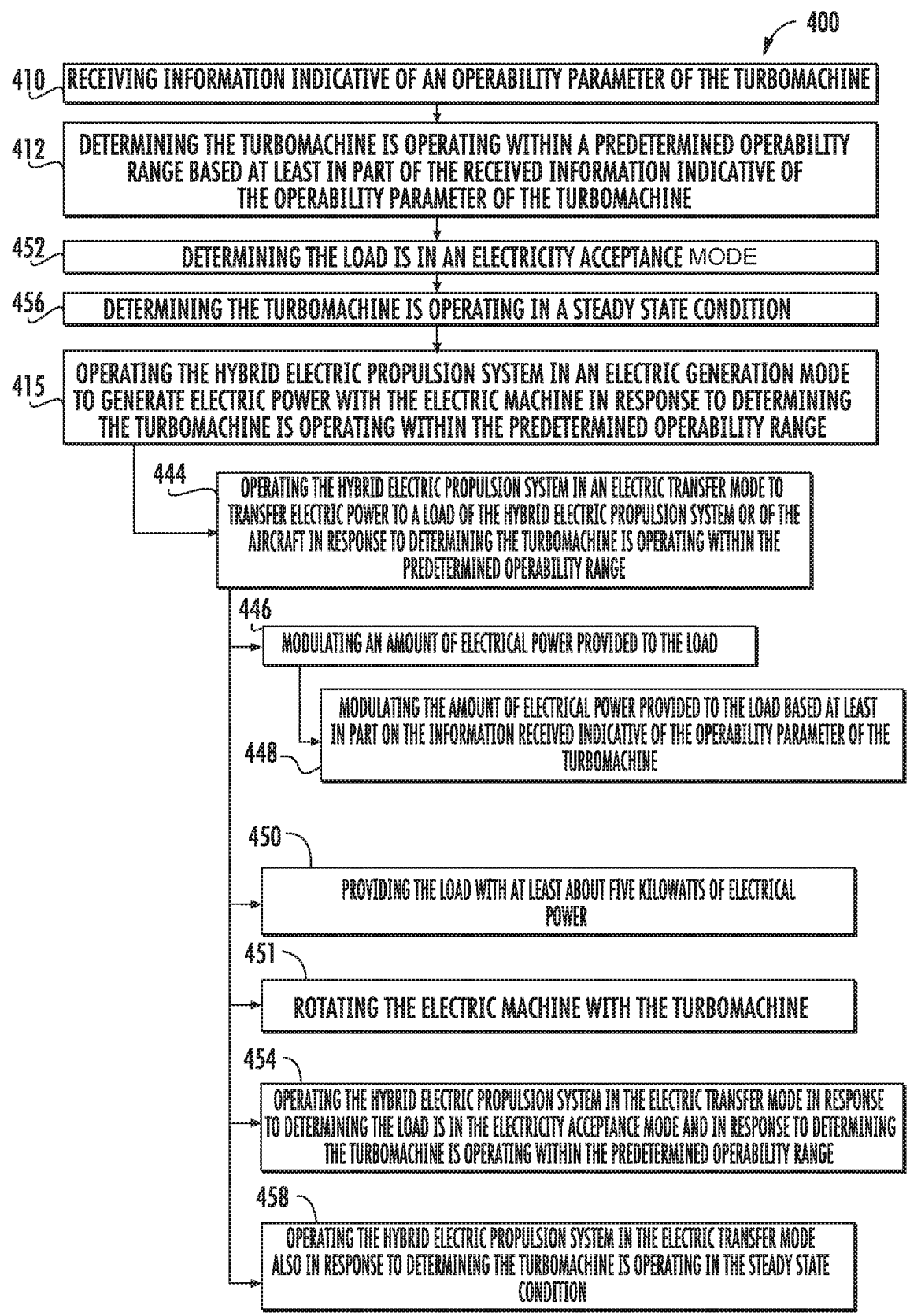
FIG. 8 flow diagram of a method of operating a hybrid electric propulsion system of an aircraft in accordance with yet another exemplary aspect of the present disclosure

For example, referring now briefly to FIG. 8, a flow diagram of the method 400 in accordance with another exemplary aspect of the present disclosure is provided. As is depicted, the exemplary aspect of the method 400 depicted in FIG. 8 generally includes at (410) receiving information indicative of an operability parameter of the turbomachine and at (412) determining the turbomachine is operating within a predetermined operability range based at least in part of the received information indicative of the operability parameter of the turbomachine. Additionally, the exemplary aspect of the method 400 depicted in FIG. 8 further includes at (415) operating the hybrid electric propulsion system in an electric generation mode to generate electric power with the electric machine in response to determining the turbomachine is operating within the predetermined operability range. In certain exemplary aspects, operating the hybrid electric propulsion system in an electric generation mode at (415) may include operating the hybrid electric propulsion system in an electric charge mode to charge the electric energy storage unit with the electric machine (see, e.g., (414) of FIG. 6). Alternatively, however, the method 400 may be used to provide electrical power to any other suitable load of the aircraft or of the hybrid electric propulsion system. As used herein, the term "load" refers to any component capable of accepting electrical power. For example, the load may be an electrical system of the aircraft configured to power one or more features or components of the aircraft, an electric fan of the hybrid-electric propulsion system, the electric energy storage unit of the hybrid electric propulsion system, etc.

Accordingly, for the exemplary aspect depicted, operating the hybrid electric propulsion system in an electric generation mode at (415) includes at (444) operating the hybrid electric propulsion system in an electric transfer mode to transfer electric power to a load of the hybrid electric propulsion system or of the aircraft in response to determining the turbomachine is operating within the predetermined operability range at (412).

Notably, in other respects, the more general aspect of the method 400 described in FIG. 8 may be similar to the other exemplary aspects of the method 400 described above. For example, as is depicted, for the exemplary aspect of the method 400 of FIG. 8, operating the hybrid electric propulsion system in the electric transfer mode at (444) includes at (446) modulating an amount of electrical power provided to the load. More specifically, modulating the amount of electrical power provided to the load at (446) includes at (448) modulating the amount of electrical power provided to the load based at least in part on the information received at (410) indicative of the operability parameter of the turbomachine. Further, for the exemplary aspect depicted, operating the hybrid electric propulsion system in the electric transfer mode at (444) includes at (450) providing the load with at least about five kilowatts of electrical power and at (451) rotating the electric machine with the turbomachine.

Additionally, for the exemplary aspect of the method 400 of FIG. 8, the method includes at (452) determining the load is in an electricity acceptance mode. (For example, when the load is an electric energy storage unit, the electricity acceptance mode may be the charge acceptance mode, however, in other aspects, the electricity acceptance mode may generally refer to a mode of the component in which it may be desirable to accept electrical power, safe to accept electrical power, etc.) With such an exemplary aspect, operating the hybrid electric propulsion system in the electric transfer mode at (444) includes at (454) operating the hybrid electric propulsion system in the electric transfer mode in response to determining the load is in the electricity acceptance mode at (452) and in response to determining the turbomachine is operating within the predetermined operability range at (412).

Moreover, for the exemplary aspect of the method 400 of FIG. 8, the method also includes at (456) determining the turbomachine is operating in a steady state condition. With such an exemplary aspect, operating the hybrid electric propulsion system in the electric transfer mode at (444) further includes at (458) operating the hybrid electric propulsion system in the electric transfer mode also in response to determining the turbomachine is operating in the steady state condition at (456).

Accordingly, it will be appreciated that with such an exemplary aspect, the method 400 may more broadly include operating the hybrid electric propulsion system in the electric generation mode to generate electric power with the electric machine in response to determining the turbomachine is operating within the predetermined operability range (as opposed to operating the hybrid electric propulsion system in the electric charge mode), and further may provide such electric power generated to any suitable load of the aircraft or propulsion system.

Figure 9:
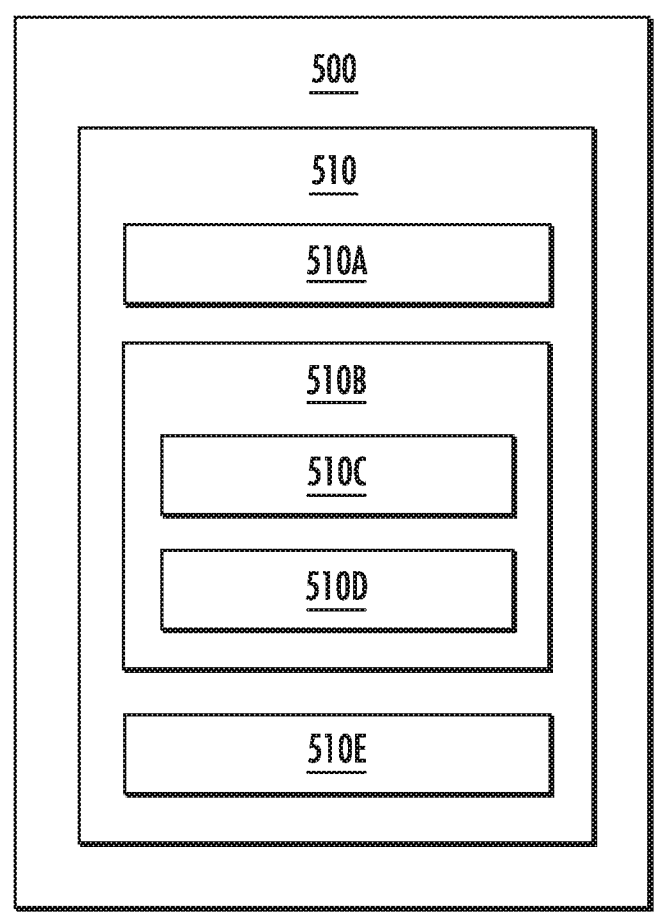
FIG. 9 is a computing system according to example aspects of the present disclosure.

Referring now to FIG. 9, an example computing system 500 according to example embodiments of the present disclosure is depicted. The computing system 500 can be used, for example, as a controller 72 of a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating a hybrid electric propulsion system of an aircraft (e.g., method 300), as described herein, and/or any other operations or functions of the one or more computing device(s) 510. Accordingly, it will be appreciated, that in certain exemplary aspects, the exemplary methods 300, 400 described above with reference to FIGS. 5 through 8 may be a computer-implemented method, such that one or more of the respective steps described above are implemented using one or more computing devices. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of operation modes of the hybrid electric propulsion system, power reserve levels of an electric energy storage unit, rotational speeds of one or more shafts or spools of the turbomachine, and/or one or more loads on the one or more shafts or spools of the turbomachine.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a hybrid-electric propulsion system of an aircraft, the hybrid-electric propulsion system comprising a turbomachine and an electric machine coupled to the turbomachine, the method comprising:
   receiving information indicative of an operability parameter of the turbomachine;
   determining the turbomachine is operating within a predetermined operability range based at least in part on the received information indicative of the operability parameter of the turbomachine;
   operating the hybrid electric propulsion system in an electric standby mode in response to determining the operability parameter of the turbomachine is outside of the predetermined operability range, wherein operating the hybrid electric propulsion system in the electric standby mode comprises providing power to the electric machine; and
   operating the hybrid electric propulsion system in an electric generation mode to generate electric power with the electric machine in response to determining the turbomachine is operating within the predetermined operability range;
   wherein operating the hybrid electric propulsion system in the electric generation mode to generate electric power with the electric machine comprises operating the hybrid electric propulsion system in an electric transfer mode to transfer electric power to a load, and wherein a first amount of electrical power is provided from the electric machine to an electric energy storage unit when the operability parameter of the turbomachine is below an upper threshold of the predetermined operability range by a first quantity and a second amount of electrical power is provided from the electric machine to the electric energy storage unit when the operability parameter of the turbomachine is below the upper threshold of the predetermined operability range by a second quantity, the first amount being greater than the second amount and the first quantity being greater than the second quantity.

2. The method of claim 1, wherein receiving information indicative of the operability parameter of the turbomachine comprises receiving information indicative of an exhaust gas temperature of the turbomachine, and wherein determining the turbomachine is operating within the predetermined operability range comprises determining the exhaust gas temperature of the turbomachine is below an exhaust gas temperature threshold.

3. The method of claim 1, wherein receiving information indicative of the operability parameter of the turbomachine comprises receiving information indicative of a stall margin of the turbomachine, and wherein determining the turbomachine is operating within the predetermined operability range comprises determining the stall margin of the turbomachine is above a stall margin threshold.

4. The method of claim 1, wherein receiving information indicative of the operability parameter of the turbomachine comprises receiving information indicative of an acceleration demand of the turbomachine, and wherein determining the turbomachine is operating within the predetermined operability range comprises determining the acceleration demand of the turbomachine is below a predetermined threshold.

5. The method of claim 1, wherein operating the hybrid electric propulsion system in the electric generation mode to generate electric power comprises operating the hybrid electric propulsion system in an electric charge mode to charge the electric energy storage unit with the electric machine in response to determining the turbomachine is operating within the predetermined operability range.

6. The method of claim 5, further comprising:
determining the electric energy storage unit is in a charge acceptance mode, wherein determining the electric energy storage unit is in the charge acceptance mode comprises determining a state of charge of the electric energy storage unit is below a predetermined maximum level;
wherein operating the hybrid electric propulsion system in the electric charge mode comprises operating the hybrid electric propulsion system in the electric charge mode in response to determining the electric energy storage unit is in the charge acceptance mode and in response to determining the turbomachine is operating within the predetermined operability range.

7. The method of claim 6, wherein determining the electric energy storage unit is in the charge acceptance mode comprises receiving information indicative of a temperature of the electric energy storage unit and determining the temperature of the electric energy storage unit is within a specified range.

8. The method of claim 5, wherein operating the hybrid electric propulsion system in the electric charge mode to charge the electric energy storage unit with the electric machine further comprises modulating an amount of electrical power provided to the electric energy storage unit.

9. The method of claim 1, wherein operating the hybrid electric propulsion system in the electric transfer mode to transfer electric power to the load comprises operating the hybrid electric propulsion system in an electric transfer mode to transfer electric power to the load of the hybrid electric propulsion system or of the aircraft in response to determining the turbomachine is operating within the predetermined operability range.

10. The method of claim 9, wherein operating the hybrid electric propulsion system in the electric transfer mode to transfer electric power to the load comprises providing the load with at least about five kilowatts of electrical power.

11. The method of claim 9, further comprising:
determining the load is in an electricity acceptance mode;
wherein operating the hybrid electric propulsion system in the electric transfer mode comprises operating the hybrid electric propulsion system in the electric transfer mode in response to determining the load is in the electricity acceptance mode and in response to determining the turbomachine is operating within the predetermined operability range.

12. The method of claim 9, further comprising:
determining the turbomachine is operating in a steady state condition, and wherein operating the hybrid electric propulsion system in the electric transfer mode to charge the electric energy storage unit with the electric machine further comprises operating the hybrid electric propulsion system in the electric transfer mode also in response to determining the turbomachine is operating in the steady state condition.

13. The method of claim 9, wherein operating the hybrid electric propulsion system in the electric transfer mode comprises rotating the electric machine with the turbomachine.

14. The method of claim 1, wherein modulating the amount of electrical power provided to the load comprises modulating the amount of electrical power provided to the load based at least in part on the received information indicative of the operability parameter of the turbomachine.

15. The method of claim 1, wherein the electric machine is a first electric machine, wherein the hybrid electric propulsion system further comprises a second electric machine and a second propulsor coupled to the second electric machine, wherein operating the hybrid electric propulsion system in the electric generation mode to generate electric power with the electric machine comprises providing electrical power from the first electric machine to the second electric machine of the hybrid electric propulsion system to drive the second propulsor and provide propulsive benefit to the aircraft.

16. The method of claim 1, wherein operating the hybrid electric propulsion system in the electric generation mode comprises modifying operation of the turbomachine to maintain a substantially constant output power.

17. The method of claim 1, wherein modulating the amount of electrical power provided to the load comprises modulating the amount of electrical power provided to the load between a first amount of electrical power and a second amount of electrical power, wherein the first amount of electrical power is greater than the second amount of electrical power, based at least in part on the received information indicative of the operability parameter of the turbomachine.

18. A hybrid-electric propulsion system comprising:
a turbomachine;
an electrical system comprising an electric machine coupled to the turbomachine and an electric energy storage unit electrically connectable to the electric machine; and
a controller configured to determine the turbomachine is operating within a predetermined operability range based at least in part on information received indicative of an operability parameter of the turbomachine, and further to operate the hybrid electric propulsion system in an electric charge mode to charge the electric energy storage unit with the electric machine in response to determining the turbomachine is operating within the predetermined operability range;
wherein operating the hybrid electric propulsion system in the electric charge mode to charge the electric energy storage unit with the electric machine comprises providing a first amount of electrical power from the electric machine to the electric energy storage unit when the operability parameter of the turbomachine is below an upper threshold of the predetermined operability range by a first quantity and providing a second amount of electrical power from the electric machine to the electric energy storage unit when the operability parameter of the turbomachine is below the upper threshold of the predetermined operability range by a second quantity.

19. The hybrid-electric propulsion system of claim 18, wherein the operability parameter is one or more of an exhaust gas temperature of the turbomachine, a stall margin of the turbomachine, and an acceleration demand of the turbomachine.

20. A method for operating a hybrid-electric propulsion system of an aircraft, the hybrid-electric propulsion system comprising a turbomachine and an electric machine coupled to the turbomachine, the method comprising:
 receiving information indicative of an operability parameter of the turbomachine;
 determining the turbomachine is operating within a predetermined operability range based at least in part on the received information indicative of the operability parameter of the turbomachine; and
 operating the hybrid electric propulsion system in an electric generation mode to generate electric power with the electric machine in response to determining the turbomachine is operating within the predetermined operability range;
 wherein receiving information indicative of the operability parameter of the turbomachine comprises receiving information indicative of an exhaust gas temperature of the turbomachine, and wherein determining the turbomachine is operating within the predetermined operability range comprises determining the exhaust gas temperature of the turbomachine is below an exhaust gas temperature threshold, and wherein if the exhaust gas temperature of the turbomachine is below the exhaust gas temperature by a first quantity, a first amount of electrical power is provided from the electric machine to an electric energy storage unit and if the exhaust gas temperature of the turbomachine is below the exhaust gas temperature by a second quantity, a second amount of electrical power is provided from the electric machine to the electric energy storage unit, the first amount being greater than the second amount and the first quantity being greater than the second quantity.

* * * * *